(12) United States Patent
Chao et al.

(10) Patent No.: US 10,771,815 B2
(45) Date of Patent: Sep. 8, 2020

(54) METHOD AND APPARATUS FOR PROCESSING VIDEO SIGNALS USING COEFFICIENT INDUCED PREDICTION

(71) Applicants: LG Electronics Inc., Seoul (KR); University of Southern California, Los Angeles, CA (US)

(72) Inventors: Yung-Hsuan Chao, Los Angeles, CA (US); Sehoon Yea, Seoul (KR); Antonio Ortega, Los Angeles, CA (US)

(73) Assignees: LG Electronics Inc., Seoul (KR); University of Southern California, Los Angeles, CA (US)

( * ) Notice: Subject to any disclaimer, the term of this patent is extended or adjusted under 35 U.S.C. 154(b) by 20 days.

(21) Appl. No.: 15/764,599

(22) PCT Filed: Sep. 29, 2016

(86) PCT No.: PCT/KR2016/010913
§ 371 (c)(1),
(2) Date: Mar. 29, 2018

(87) PCT Pub. No.: WO2017/057922
PCT Pub. Date: Apr. 6, 2017

(65) Prior Publication Data
US 2018/0288438 A1 Oct. 4, 2018

Related U.S. Application Data

(60) Provisional application No. 62/234,641, filed on Sep. 29, 2015.

(51) Int. Cl.
*H04N 19/61* (2014.01)
*H04N 19/117* (2014.01)
(Continued)

(52) U.S. Cl.
CPC .......... *H04N 19/61* (2014.11); *H04N 19/117* (2014.11); *H04N 19/12* (2014.11); *H04N 19/14* (2014.11);
(Continued)

(58) Field of Classification Search
CPC .... H04N 19/61; H04N 19/176; H04N 19/147; H04N 19/124; H04N 19/126;
(Continued)

(56) References Cited

U.S. PATENT DOCUMENTS

2013/0272422 A1* 10/2013 Lee ................ H04N 19/176
375/240.18
2014/0153651 A1* 6/2014 Urban ................ H04N 7/01
375/240.24

FOREIGN PATENT DOCUMENTS

JP 2014-007477 1/2014
JP 2014-195324 10/2014
(Continued)

OTHER PUBLICATIONS

Ortega et al. (Lifting Transforms on Graphs for Video Coding; 2011, hereinafter Ortega) (Year: 2011).*
(Continued)

*Primary Examiner* — Dave Czeakj
*Assistant Examiner* — Samuel D Fereja
(74) *Attorney, Agent, or Firm* — Fish & Richardson P.C.

(57) ABSTRACT

The present invention provides a method for encoding a video signal on the basis of a graph-based lifting transform (GBLT), comprising the steps of: detecting an edge from an intra residual signal; generating a graph on the basis of the detected edge, wherein the graph includes a node and a weight link; acquiring a GBLT coefficient by performing the GBLT for the graph; quantizing the GBLT coefficient; and entropy-encoding the quantized GBLT coefficient, wherein
(Continued)

the GBLT includes a partitioning step, a prediction step, and an update step.

6 Claims, 17 Drawing Sheets

(51) Int. Cl.
*H04N 19/96* (2014.01)
*H04N 19/147* (2014.01)
*H04N 19/12* (2014.01)
*H04N 19/90* (2014.01)
*H04N 19/176* (2014.01)
*H04N 19/14* (2014.01)
*H04N 19/625* (2014.01)
*H04N 19/124* (2014.01)
*H04N 19/91* (2014.01)
*H04N 19/11* (2014.01)
*H04N 19/13* (2014.01)
*H04N 19/196* (2014.01)
*H04N 19/107* (2014.01)
*H04N 19/50* (2014.01)

(52) U.S. Cl.
CPC ......... *H04N 19/147* (2014.11); *H04N 19/176* (2014.11); *H04N 19/625* (2014.11); *H04N 19/90* (2014.11); *H04N 19/96* (2014.11); *H04N 19/107* (2014.11); *H04N 19/11* (2014.11); *H04N 19/124* (2014.11); *H04N 19/13* (2014.11); *H04N 19/196* (2014.11); *H04N 19/50* (2014.11); *H04N 19/91* (2014.11)

(58) Field of Classification Search
CPC ........ H04N 19/18; H04N 19/14; H04N 19/13; H04N 19/154; H04N 19/19; H04N 19/91; H04N 19/103; H04N 19/46; H04N 19/172; H04N 19/196; H04N 19/149; H04N 19/192; H04N 19/11; H04N 19/159; H04N 19/136; H04N 19/593; H04N 19/117; H04N 19/122; H04N 19/44; H04N 19/70; H04N 19/105; H04N 19/107; H04N 19/132; H04N 19/82; H04N 19/86; H04N 19/12; H04N 19/129; H04N 19/17; H04N 19/60; H04N 19/96; H04N 19/115; H04N 19/139; H04N 19/194; H04N 19/625; H04N 19/137; H04N 19/157; H04N 19/463; H04N 19/109; H04N 19/119; H04N 19/182; H04N 19/186; H04N 19/30; H04N 19/59; H04N 19/85; H04N 19/90; H04N 19/134; H04N 19/174; H04N 19/184; H04N 19/395; H04N 19/48; H04N 19/50; H04N 19/52; H04N 19/527; H04N 19/142; H04N 19/15; H04N 19/177; H04N 19/40; H04N 19/436; H04N 19/51; H04N 19/543; H04N 19/567; H04N 19/597; H04N 19/63; H04N 19/102; H04N 19/152; H04N 19/162; H04N 19/164; H04N 19/166; H04N 19/1883; H04N 19/197; H04N 19/198; H04N 19/33; H04N 19/34; H04N 19/36; H04N 19/42; H04N 19/45
See application file for complete search history.

(56) References Cited

FOREIGN PATENT DOCUMENTS

| KR | 10-2011-0093532 | 8/2011 |
|---|---|---|
| KR | 10-2011-0135787 | 12/2011 |

OTHER PUBLICATIONS

Zhang et al. (Analyzing the Optimality of Predictive Transform Coding Using Graph-Based Models: 2013,). (Year: 2013).*
Chao et al., "Edge-adaptive depth map coding with lifting transform on graphs," IEEE, In Picture Coding Symposium (PCS), May 2015, 60-64.

* cited by examiner (a)

| 1 | 5 | 9  | 13 |
|---|---|----|----|
| 2 | 6 | 10 | 14 |
| 3 | 7 | 11 | 15 |
| 4 | 8 | 12 | 16 |

(b)

| d |    |    |     |     |     |
|---|----|----|-----|-----|-----|
| 6'| 2' | 6' | 10' | 14' | 10' |
| 5'| 1  | 5  | 9   | 13  | 9'  |
| 6'| 2  | 6  | 10  | 14  | 10' |
| 7'| 3  | 7  | 11  | 15  | 11' |
| 8'| 4  | 8  | 12  | 16  | 12' |
| 7'| 3' | 7' | 11' | 15' | 11' |

Sampling (c)

| 6'| 2' | 6' | 10' | 14' | 10' |
|---|----|----|-----|-----|-----|
| 5'| 1  | 5  | 9   | 13  | 9'  |
| 6'| 2  | 6  | 10  | 14  | 10' |
| 7'| 3  | 7  | 11  | 15  | 11' |
| 8'| 4  | 8  | 12  | 16  | 12' |
| 7'| 3' | 7' | 11' | 15' | 11' |

| Methods | GFT | | Lifting with GMRF sampling | | Lifting(Max Cut w /re-connection) | | Lifting (MaxCut based) | |
|---|---|---|---|---|---|---|---|---|
| | ΔPSNR(dB) | Δrate(%) | ΔPSNR(dB) | Δrate(%) | ΔPSNR(dB) | Δrate(%) | ΔPSNR(dB) | Δrate(%) |
| Foreman | 0.34 | -7.28 | 0.29 | -6.42 | 0.26 | -5.77 | 0.17 | -3.63 |
| Mobile | 0.17 | -1.46 | 0.10 | -0.97 | 0.10 | -0.96 | 0.08 | -0.51 |
| Silent | 0.22 | -4.28 | 0.20 | -3.88 | 0.18 | -3.58 | 0.09 | -1.66 |
| Deadline | 0.37 | -4.97 | 0.31 | -3.98 | 0.30 | -3.90 | 0.24 | -3.19 |

METHOD AND APPARATUS FOR PROCESSING VIDEO SIGNALS USING COEFFICIENT INDUCED PREDICTION

CROSS-REFERENCE TO RELATED APPLICATIONS

This application is a National Stage application under 35 U.S.C. § 371 of International Application No. PCT/KR2016/010913, filed Sep. 29, 2016, which claims the benefit of U.S. Provisional Patent Application No. 62/234,641, filed on Sep. 29, 2015. The disclosures of the prior applications are incorporated by reference in their entirety.

TECHNICAL FIELD

The present invention relates to a method and apparatus for encoding, decoding a video signal using a graph-based lifting transform (GBLT). Specifically, the present invention defines a model for an intra-predicted residual signal using a Gaussian Markov random field (GMRF) and designs a bipartition algorithm that minimizes in a prediction set. Furthermore, the present invention proposes a new reconnection scheme for enhancing prediction in local filter banks.

BACKGROUND ART

Compression encoding means a series of signal processing technologies for transmitting digitized information through a communication line or storing the information in a form suitable for a storage medium. Media, such as a picture, an image and voice, may be the subject of compression encoding. In particular, a technology performing compression encoding on an image is called video image compression.

Next-generation video content will have features of high spatial resolution, a high frame rate, and high dimensionality of scene representation. Processing such content will result in a tremendous increase in terms of memory storage, a memory access rate, and processing power.

Therefore, there is a need to design a coding tool for processing next-generation video content more efficiently.

In particular, a graph is a data representation form useful for describing information about the relationship between pixels, and a graph-based signal processing method of performing processing by expressing information about the relationship between pixels in a graph form. A graph Fourier transform (GFT) is used when processing an image/video, including compression and noise removal. An advantage of the GFT is the ability to be adapted to the characteristics of signals with respect to discontinuous locations that are signaled and expressed by a graph. The use of the GFT when performing a block-based process is first introduced into depth map coding, and high frequency edge structures may be easily expressed in a low bit rate. Edges having a small pixel gradient are expressed as an additional optimized weight $w \in (0, 1)$. A main object of the GFT is to require eigen decomposition that may be a complex number. Furthermore, transform operation requires $O(N^2)$ operations. In this case, some graphs are selected as template, and corresponding eigen vectors are previously calculated and stored. However, such a method can be applied to only small block sizes, that is, 4×4 and 8×8, and the number of different templates considered is relatively small.

In order to handle complexity related to the GFT, a graph-based lifting transform (GBLT) may be applied and may be applied to irregular graphs. Complexity can be much reduced than the GFT using localized filtering. Lifting regarding graphs have been applied to image noise removal and video compression, but they are global transforms and applied to the entire image. Lifting may be applied to the block-based coding of depth maps, surpasses performance of discrete cosine transform (DCT)-based coding, and has results comparable to the use of the GFT.

In this case, a simple lifting-based transform design well operates with respect to piecewise constant images, but does not provide better advantages than the DCT with respect to more common signals, such as natural images or intra prediction residuals.

DISCLOSURE

Technical Problem

The present invention is to define a model for an intra-predicted residual signal using GMRF and to design a bipartition algorithm that minimizes energy in a prediction set.

Furthermore, the present invention is to propose a new reconnection scheme that improves prediction in local filter banks.

Furthermore, the present invention is to propose a method of determining a transform method through a rate distortion (RD) cost comparison of a plurality of transform methods including a graph-based lifting transform.

Furthermore, the present invention is to propose a method of encoding a video signal using a graph-based lifting transform.

Furthermore, the present invention is to propose a method of decoding a video signal using a graph-based lifting transform.

Furthermore, the present invention is to propose a method of signaling a mode index using a graph-based lifting transform.

Furthermore, the present invention is to propose a method of minimizing a maximum A Posteriori (MAP) estimate error within a prediction set.

Technical Solution

The present invention provides a method of defining a model for an intra-predicted residual signal using GMRF and designing a bipartition algorithm that minimizes energy in a prediction set.

Furthermore, the present invention proposes a new reconnection scheme that improves prediction in local filter banks.

Furthermore, the present invention proposes a method of determining a transform method through a rate distortion (RD) cost comparison of a plurality of transform methods including a graph-based lifting transform.

Furthermore, the present invention proposes a method of encoding and decoding a video signal using a graph-based lifting transform.

Furthermore, the present invention proposes a method of signaling a mode index using a graph-based lifting transform.

Furthermore, the present invention proposes a method of minimizing a maximum A Posteriori (MAP) estimate error within a prediction set.

Advantageous Effects

The present invention proposes a transform method for intra-predicted video coding based on a graph-based lifting transform. A bipartition algorithm provides a coding gain that has been proven based on a GMRF model and that is better than a MaxCut-based bipartition method.

Furthermore, although a simple MaxCut bipartition method is used, a GMRF-based approach that surpasses DCT and that has high complexity and GFT can be approximated using a better graph reconnection. Furthermore, the present invention may be applied to video coding having a greater block size.

DESCRIPTION OF DRAWINGS

FIG. 9 is an embodiment to which the present invention is applied and is a diagram for illustrating a boundary extension for pixels neighboring a block boundary.

FIG. 11 shows embodiments to which the present invention is applied, wherein FIG. 11(a) shows an image having a smoothing area (left half) and a high dispersion area (right half), FIG. 11(b) shows a bipartition graph used with respect to a prediction/update operator having 1-hop links, and FIG. 11(c) shows a bipartition graph used for prediction/update having links derived from a Kron reduction.

FIG. 16 is an embodiment to which the present invention is applied and is a table for a comparison in the average PSNR gains and bit rate reductions between GFT, lifting GMRF sampling, MaxCut-based lifting, and MaxCut-based lifting using the reconnection scheme.

BEST MODE

Figure 1:
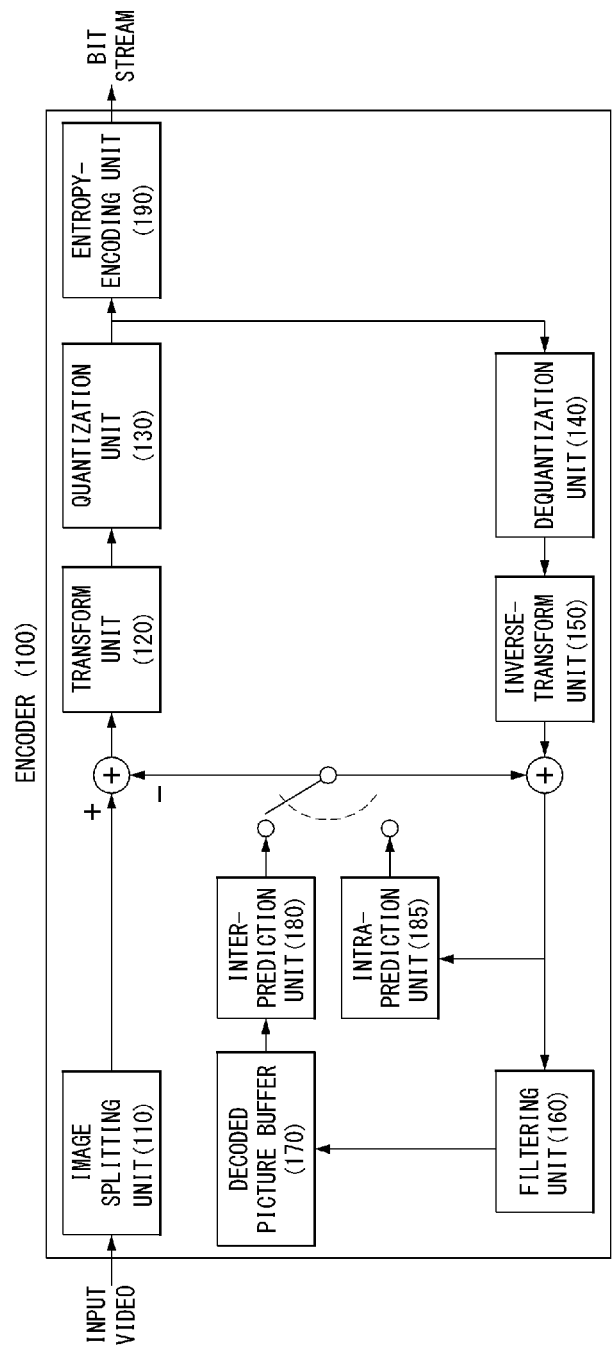
FIG. 1 shows a schematic block diagram of an encoder for encoding a video signal according to one embodiment of the present invention.

The present invention provides a method of encoding a video signal based on a graph-based lifting transform (GBLT), including detecting an edge from an intra residual signal; generating a graph based on the edge, wherein the graph includes a node and a weight link; obtaining a GBLT coefficient by performing the GBLT for the graph; quantizing the GBLT coefficient; and entropy-encoding the quantized GBLT coefficient, wherein the GBLT includes a split process, a prediction process, and an update process.

In the present invention, the method further includes determining a mode index corresponding to the GBLT and entropy-encoding the mode index.

In the present invention, the method further includes obtaining a DCT coefficient by performing a DCT for the intra residual signal and comparing a rate-distortion cost of the DCT coefficient with a rate-distortion cost of the GBLT coefficient, wherein when the rate-distortion cost of the GBLT coefficient is smaller than the rate-distortion cost of the DCT coefficient, the mode index corresponding to the GBLT is determined.

In the present invention, the split process is performed to minimize a maximum A Posteriori (MAP) estimate error within a prediction set.

In the present invention, the split process includes calculating the size of an update set; selecting a node minimizing an MAP estimate error within a prediction set based on the size of the update set; and calculating an update set for the selected node.

In the present invention, the graph is reconnected prior to a next GBLT.

The present invention provides a method of decoding a video signal based on a graph-based lifting transform (GBLT), including extracting a mode index indicative of a transform method from the video signal; deriving a transform corresponding to the mode index, wherein the transform indicates one of a DCT and the GBLT; performing an inverse transform for an intra residual signal based on the transform; and generating a reconstructed signal by adding the inverse-transformed intra residual signal to a prediction signal.

In the present invention, the split process of the GBLT is performed to minimize a maximum A Posteriori (MAP) estimate error within a prediction set.

In the present invention, the mode index is determined by comparing the rate-distortion cost of a DCT coefficient with the rate-distortion cost of a GBLT coefficient.

The present invention provides an apparatus for encoding a video signal based on a graph-based lifting transform (GBLT), including an edge detection unit configured to detect an edge from an intra residual signal; a graph-based lifting transform unit configured to generate a graph based on the detected edge and obtain a graph-based lifting transform (GBLT) coefficient by performing the GBLT for the graph; a quantization unit configured to quantize the GBLT coefficient; and an entropy encoding unit configured to perform entropy encoding for the quantized GBLT coefficient, wherein the GBLT includes a split process, a prediction process, and an update process.

In the present invention, the apparatus further includes a mode selection unit configured to determine a mode index corresponding to the GBLT, wherein the mode index is entropy-encoded by the entropy encoding unit.

In the present invention, the apparatus further includes a DCT unit configured to obtain a DCT coefficient by performing a DCT for the intra residual signal and a mode selection unit configured to compare a rate-distortion cost of the DCT coefficient with a rate-distortion cost of the GBLT coefficient, wherein the mode selection unit selects a mode index corresponding to the GBLT when the rate-distortion cost of the GBLT coefficient is smaller than the rate-distortion cost of the DCT coefficient.

The present invention provides an apparatus for decoding a video signal based on graph-based lifting transform (GBLT), including a parsing unit configured to extract a mode index indicative of a transform method from the video signal; an inverse transform unit configured to derive a transform corresponding to the mode index and perform an inverse transform for an intra residual signal based on the transform; and a reconstruction unit configured to generate a reconstructed signal by adding the inverse-transformed intra residual signal to a prediction signal, wherein the transform indicates one of a DCT and the GBLT.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Further, partitioning, decomposition, splitting, and split, etc. may also be appropriately substituted with each other for each coding process.

FIG. 1 shows a schematic block diagram of an encoder for encoding a video signal, according to one embodiment of the present invention.

Referring to FIG. 1, the encoder 100 may include an image split unit 110, a transform unit 120, a quantization unit 130, an inverse quantization unit 140, an inverse transform unit 150, a filtering unit 160, a decoded picture buffer (DPB) 170, an inter prediction unit 180, an intra prediction unit 185, and an entropy encoding unit 190.

The image split unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square or to a block of a variable size other than a square.

The transform unit 120 may use a graph-based signal processing method of expressing inter-pixel relationship information in a graph form and processing the information. For example, the transform unit 120 may include a graph-based transform unit. The graph-based transform unit may detect an edge from an intra residual signal and generate a graph based on the detected edge. Furthermore, the graph-based transform unit may obtain a graph-based lifting transform (GBLT) coefficient by performing a graph-based lifting transform (GBLT) for the graph. In this case, the graph may include a node and a weight link. The node may be expressed as a vertex or a vertex parameter, and the weight link may be expressed as an edge or an edge weight.

The GBLT coefficient may be quantized through the quantization unit 130, and the quantized GBLT coefficient may be entropy-encoded through the entropy encoding unit 190.

In one embodiment, the GBLT provides a method including a split process, a prediction process, and an update process.

In one embodiment, in the present invention, a mode index corresponding to the GBLT may be determined, and the mode index may be entropy-encoded, but the present invention is not limited thereto and the GBLT may be directly transmitted to the decoder or may be derived by the decoder. For example, the encoder may transmit an edge map for a residual signal. The decoder may generate a graph based on the edge map and derive the GBLT from the graph.

In one embodiment, in the present invention, a DCT coefficient may be obtained by performing a DCT for the intra residual signal, and a more optimized transform coefficient may be obtained by comparing the RD cost of the DCT coefficient with the RD cost of the GBLT coefficient. For example, when the RD cost of the GBLT coefficient is smaller than the RD cost of the DCT coefficient, a mode index corresponding to the GBLT may be determined.

In one embodiment, the split process may be performed to minimize a maximum A Posteriori (MAP) estimate error within a prediction set.

In one embodiment, the split process may include calculating the size of an update set, selecting a node that minimizes an MAP estimate error within a prediction set based on the size of the update set, and calculating an update set for the selected node.

In one embodiment, the graphs may be reconnected prior to a next GBLT.

In one embodiment, the graph may have been determined based on an intra prediction mode using the residual block.

In one embodiment, the graphs may have been obtained using edge information of the residual block.

The graph-based transform unit to which the present invention is applied may be embodied as a separate functional unit. In this case, the graph-based transform unit may be located in front of the transform unit 120. However the present invention is not limited thereto.

The quantization unit 130 may quantize the transform coefficient and transmits the quantized coefficient to the entropy encoding unit 190. The entropy encoding unit 190 may entropy-code the quantized signal and then output the entropy-coded signal as bit streams.

The quantized signal output by the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

The intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter prediction unit 180 or the intra prediction unit 185 may be used to generate the reconstructed signal or used to generate the residual signal.

Figure 2:
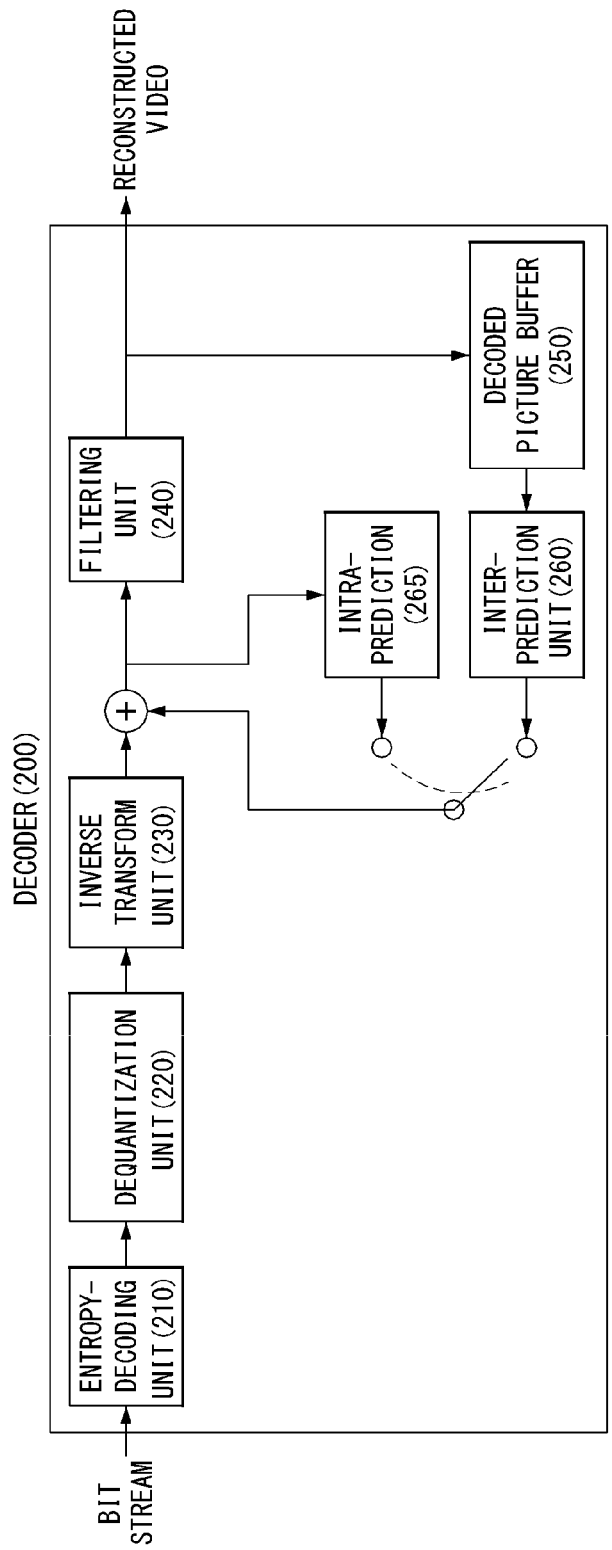
FIG. 2 shows a schematic block diagram of a decoder for decoding a video signal according to one embodiment of the present invention.

FIG. 2 shows a schematic block diagram of a decoder for decoding a video signal according to one embodiment of the present invention.

Referring to FIG. 2, the decoder 200 may include an entropy decoding unit 210, an inverse quantization unit 220, an inverse transform unit 230, a filtering unit 240, a decoded picture buffer (DPB) 250, an inter prediction unit 260 and an intra prediction unit 265.

A reconstructed video signal output by the decoder 200 may be reproduced using a reproducing device.

The decoder 200 may receive the signal output by the encoder as shown in FIG. 1. The received signal may be entropy-decoded via the entropy decoding unit 210.

In one embodiment of the present invention, the decoder or the entropy decoding unit 210 may receive a mode index. In this case, the mode index may mean information indicative of a transform method or a transform type. For example, a transform corresponding to the mode index may be any one of a DCT and a GBLT.

An entropy-decoded mode index may be transmitted to the inverse quantization unit 220 and inverse quantized, and may be transmitted to the inverse transform unit 230 and used. For another example, if the entropy-decoded mode index has not been quantized, it may be transmitted to the inverse transform unit 230 and used without the intervention of the inverse quantization unit.

The inverse quantization unit 220 obtains a transform coefficient from an entropy-decoded signal using quantization step size information. In this case, the various embodiments described in the transform unit 120 of FIG. 1 may have been applied to the obtained transform coefficient.

The inverse transform unit 230 obtains a residual signal by performing an inverse-transform for the transform coefficient. In this case, a graph-based transform matrix used upon performing the inverse transform indicates a transform corresponding to a mode index. For example, the transform corresponding to the mode index may be any one of a DCT and a GBLT.

A reconstructed signal may be generated by adding the obtained residual signal to the prediction signal output by the inter prediction unit 260 or the intra prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

Herein, detailed descriptions for the filtering unit 160, the inter prediction unit 180 and the intra prediction unit 185 of the encoder 100 may be equally applied to the filtering unit 240, the inter prediction unit 260 and the intra prediction unit 265 of the decoder 200 respectively.

Figure 3:
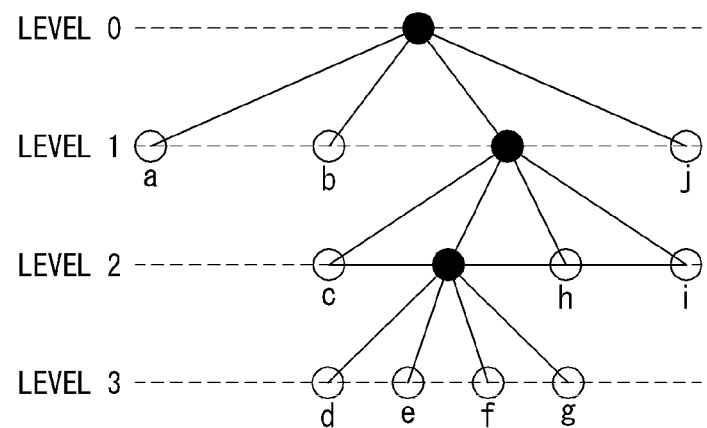
FIG. 3 is a diagram for illustrating a split structure of a coding unit according to one embodiment of the present invention.
Figure 3:
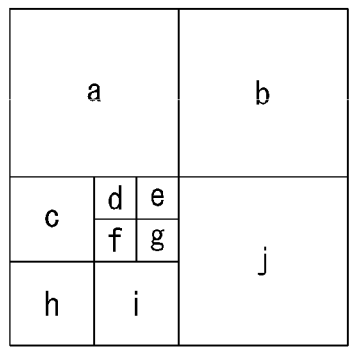

FIG. 3 is a diagram for illustrating a split structure of a coding unit, according to one embodiment of the present invention.

The encoder may split or divide one image or picture into a rectangular coding tree unit (CTU). Thereafter, the encoder may sequentially encode CTUs one by one according to the raster scan order.

For example, the size of a CTU may be set to 64×64, 32×32 or 16×16, but the present invention is not limited thereto. The encoder may select the size of a CTU based on resolution of an input image or the characteristics of an input image. A CTU may include a coding tree block (CTB) for a luma component and a coding tree block (CTB) for corresponding two chroma components.

A single CTU may be decomposed into a quad-tree (hereinafter referred to as a "QT") structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for the coding process of an input image, for example, a base unit for intra/inter-predictions. The CU may include a CB for a luma component and a CB for two chroma components corresponding to the luma component. For example, the size of the CU may be set to 64×64, 32×32, 16×16 or 8×8. However, the present invention is not limited thereto. In the case of a high-resolution image, the size of the CU may be increased or varied.

Referring to FIG. 3, the CTU may correspond to the root node, and may have the smallest depth (i.e., level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(b), each of the coding units CU(a), CU(b), and CU(j) corresponding to nodes a, b and j, respectively, is split in a CTU once, thus having a depth of level 1.

At least one of sub-nodes; each one having a depth of level 1 may be further split into a QT form. Among the sub-nodes, each having a depth of level 2, a sub-node (i.e., a leaf node) that is not further divided corresponds to a CU. For example, in FIG. 3(b), each of the coding units CU(c), CU(h), and CU(i) corresponding to nodes c, h and i respectively are partitioned two times in the CTU and thus has a depth of level 2.

Further, among the sub-nodes, each having a depth of level 2, at least one sub-node may be further split into a QT form. Among the sub-nodes, each having a depth of level 3, a sub-node (i.e., a leaf node) that is not further divided corresponds to a CU. For example, in FIG. 3(b), each of the coding units CU(d), CU(e), CU(f) and CU(g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag." The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

In the embodiment shown in FIG. 3, although the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8 or 4×4. However, the present invention is not limited thereto. For high-resolution images, the size of a TU may be larger or may vary.

For a single TU, information indicating whether or not the TU is divided may be transmitted to the decoder. For example, the information may be defined as a split transform flag and may be represented by a syntax element "split_transform_flag".

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, a CU is a base unit for the coding process in which the intra-prediction or inter-prediction is performed. In order to more effectively code the input image, the CU may be divided into PUs (Prediction Units).

A PU is a base unit forming a prediction block. It is possible to generate different prediction blocks on a PU basis even within a single CU. The PU may be divided differently depending on whether an intra-prediction mode or an inter-prediction mode is used as a coding mode for a CU to which the PU belongs.

Figure 4:
FIG. 4 is a diagram for illustrating a process of obtaining a graph-based transform matrix based on a one-dimensional graph and a two-dimensional graph according to one embodiment of the present invention.
Figure 4:
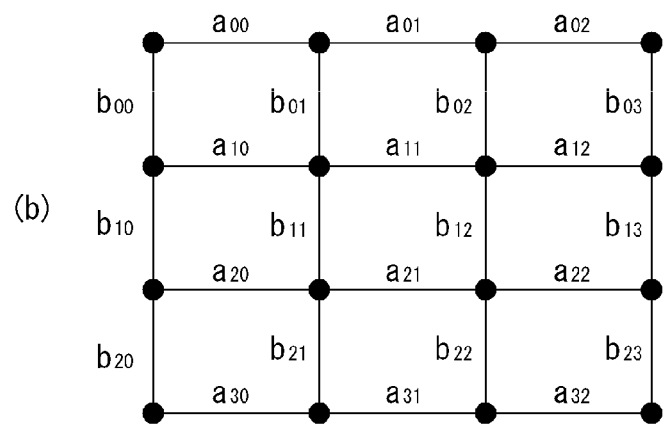

FIG. 4 is a diagram for illustrating a process of obtaining a graph-based transform matrix based on a one-dimensional graph and a two-dimensional graph, according to one embodiment of the present invention.

In an embodiment of the present invention, graph types that may be used to process a pixel block in an image may be described with reference to FIG. 4. For example, FIG. 4(a) indicates a one-dimensional graph corresponding to each line of the pixel bloc, while FIG. 4(b) indicates a two-dimensional graph corresponding to the pixel block.

A graph vertex may be associated with each pixel in the pixel block, and a value of the graph vertex may be represented by a pixel value. Further, a graph edge may refer to a line connecting the graph vertexes. The graph edge may be used to indicate what form statistical dependence in the signal has. A value representing an intensity of the statistical dependence may be called an edge weight.

For example, referring to FIG. 4(a) which indicates the one-dimensional graph, 0, 1, 2, and 3 represent positions of the vertexes respectively, and w0, w1, and w2 represent weights of edges between the vertexes respectively. Referring to FIG. 4(b) which indicates the two-dimensional graph, aij (i=0, 1, 2, 3, j=0, 1, 2) and bkl (k=0, 1, 2, 1=0, 1, 2, 3) represent weights of edges between the vertexes respectively.

Each vertex may be connected to any other vertexes. An edge weight of zero may be assigned to an edge that connects non-associated or weakly-associated vertices. However, for simplicity of presentation, an edge with the edge weight of zero may be completely eliminated.

In an embodiment of the present invention, a transform obtained from a graph signal may be defined as a graph-based transform (hereinafter referred to as a "GBT"). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph In this case, the GBT may be obtained through a following process. For example, the encoder or decoder may obtain graph information from a target block in a video signal. A Laplacian matrix L may be obtained from the obtained graph information using Equation 1 below:

$$L=D-A$$ [Equation 1]

wherein D indicates a diagonal matrix, and A indicates an adjacency matrix.

Thereafter, the Laplacian matrix L may be subjected to eigen decomposition expressed into Equation 2 to acquire a GBT kernel:

$$L=U\Lambda U^T$$ [Equation 2]

wherein L indicates the Laplacian matrix, U indicates an eigen matrix, and $U^T$ indicates a transpose matrix. In Equation 2, the eigen matrix U may provide a graph-based Fourier transform that is specific to a signal matching a corresponding graph model. For example, the eigen matrix U satisfying Equation 2 may mean a GBT kernel.

Figure 5:
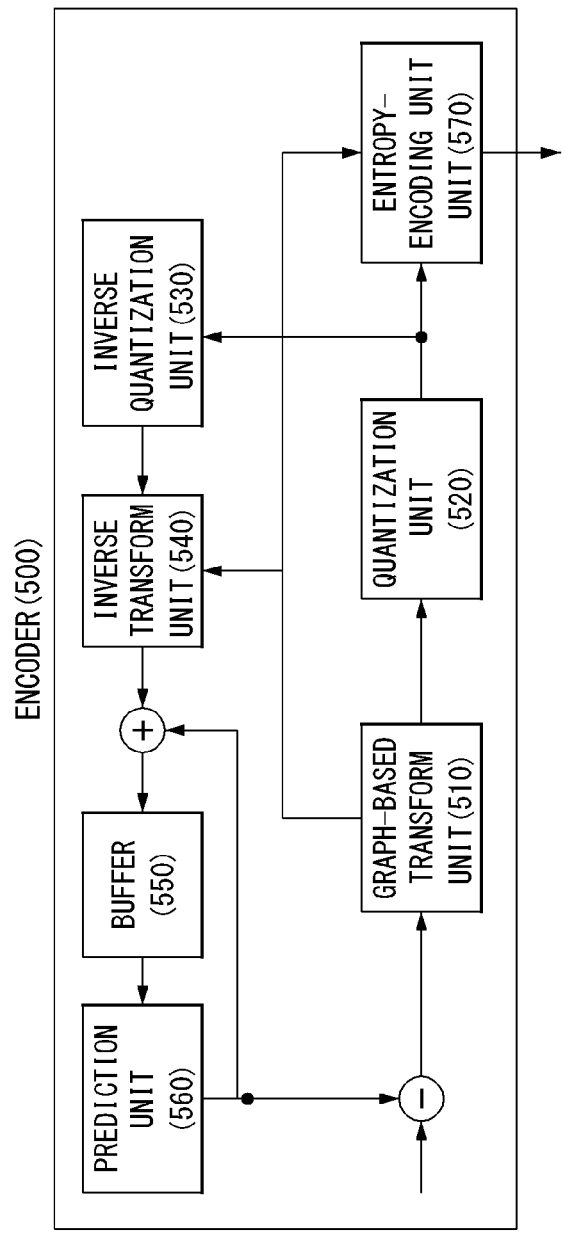
FIG. 5 illustrates a schematic block diagram of an encoder that processes graph-based signals, according to one embodiment of the present invention.

FIG. 5 illustrates a schematic block diagram of an encoder that processes graph-based signals, according to one embodiment of the present invention.

Referring to FIG. 5, the encoder 500 according to the present invention may include a graph-based transform unit 510, a quantization unit 520, an inverse quantization unit 530, an inverse transform unit 540, a buffer 550, a prediction unit 560, and an entropy encoding unit 570.

The encoder 500 may receive a video signal and subtracts a predicted signal output by the prediction unit 560 from the video signal to generate a residual signal. The generated residual signal may be transmitted to the graph-based transform unit 510. The graph-based transform unit 510 may generate a transform coefficient by applying a transform to the residual signal.

The graph-based transform unit may detect an edge from an intra residual signal and generate a graph based on the detected edge. Furthermore, the graph-based transform unit may obtain a graph-based lifting transform (GBLT) coefficient by performing a graph-based lifting transform (GBLT) for the graph.

In one embodiment, the GBLT provides a method including a split process, a prediction process, and an update process.

In one embodiment, in the present invention, a mode index corresponding to the GBLT may be determined, and the mode index may be entropy-encoded, but the present invention is not limited thereto and the GBLT may be directly transmitted to the decoder or may be derived by the decoder. For example, the encoder may transmit an edge map for a residual signal. The decoder may generate a graph based on the edge map and derive the GBLT from the graph.

In one embodiment, in the present invention, a DCT coefficient may be obtained by performing a DCT for the intra residual signal, and a more optimized transform coefficient may be obtained by comparing the RD cost of the DCT coefficient with the RD cost of the GBLT coefficient. For example, when the RD cost of the GBLT coefficient is smaller than the RD cost of the DCT coefficient, a mode index corresponding to the GBLT may be determined.

In one embodiment, the split process may be performed to minimize a maximum A Posteriori (MAP) estimate error within a prediction set.

In one embodiment, the split process may include calculating the size of an update set, selecting a node that minimizes an MAP estimate error within a prediction set based on the size of the update set, and calculating an update set for the selected node.

In one embodiment, the graphs may be reconnected prior to a next GBLT.

In one embodiment, the graph may have been determined based on an intra prediction mode using the residual block.

In one embodiment, the graphs may have been obtained using edge information of the residual block.

In another embodiment, the graph-based transform unit 510 may generate at least one data cluster for the video data, generate at least one graph Laplacian matrix corresponding thereto, and perform a transform optimization based on multiple graph-based models including the at least one graph Laplacian matrix to generate an optimized transform matrix. Here, the graphs corresponding to the multiple graph-based models may be generated through the following embodiments.

In another embodiment, an adaptive low complexity GBT template set may be used to use the statistical characteristics of the residual signal. The terms as used herein, such as, a GBT template, a graph template, a template graph, a GBT template set, a graph template set or a template graph set, etc. may be generic terms selected to illustrate the present invention and therefore may be appropriately substituted and interpreted in each coding process. Also, in the description, GBT may be substituted and applied by GBLT.

In another embodiment, the graph-based transform unit 510 may extract graph parameters in a graph corresponding to a target unit in the residual signal. For example, the graph parameter may include at least one of a vertex parameter, and an edge parameter. The vertex parameter includes at least one of vertex positions and the number of vertexes. The edge parameter may include at least one of edge weight values and the number of edge weights. Further, the graph parameter may be defined as a set of a certain number of parameters. For example, the edge parameter set may be defined as a weight matrix.

In another embodiment, the graph-based transform unit 510 may generate a graph based on the extracted graph parameter, and the generated graph may be set to a base template. Hereinafter, it will be called a base template graph. For example, the base template graph may be a uniformly weighted graph. In this case, the uniformly weighted graph may be expressed as $G_{uni}$. The nodes of the graph correspond to the pixels of the target unit. All edge weights of the target unit may be set to $W_{uni}$.

In addition, in accordance with the present invention, T different graphs may be generated by adjusting the edge weight set of the base template graph. Hereinafter, the T different graphs may be called a template graph set, which may be expressed using a following Equation 3:

$$\{G_i\}_{i=1}^T \qquad \text{[Equation 3]}$$

Additionally, in accordance with the present invention, a block-adaptive template graph may be generated by reducing weights of edges around corners in a transform block. For example, the edges around the corners in the transform block may be set to $W_{weak}$, which is an edge weight smaller than $W_{uni}$. In this case, $W_{weak}$ may indicate a weak edge weight.

Furthermore, in accordance with the present invention, the complexity may be reduced by allowing the edges around the corners in the transform block to have the same weak edge weight value $W_{weak}$.

Moreover, in accordance with the present invention, in order to reflect the signal characteristics adaptively based on different positions of the residual blocks, there is provided a method to select T different graphs as a template graph set. Further, in accordance with the present invention, a GBT may be acquired by applying spectral decomposition to the selected template graph set.

The quantization unit 520 may quantize the GBLT coefficient and transmit the quantized GBLT coefficient to the entropy encoding unit 570.

The entropy encoding unit 570 may perform entropy coding on the quantized signal and output an entropy-coded signal.

The quantized signal output by the quantization unit 520 may be used to generate a prediction signal. For example, the inverse quantization unit 530 and the inverse transform unit 540 in the loop of the encoder 500 may perform inverse quantization and inverse transform on the quantized signal so that the quantized signal is reconstructed as a residual signal. A reconstructed signal may be generated by adding the reconstructed residual signal to the prediction signal output by the prediction unit 560.

The buffer 550 may store therein the reconstructed signal for further reference by the prediction unit 560.

The prediction unit 560 may generate the prediction signal using the previously reconstructed signal stored in the buffer 550. In this case, the present invention relates to efficiently predicting a region in a target image using a region in an anchor image. In this case, the anchor image may refer to a reference image, a reference picture or a reference frame. The efficiency may be determined by calculating a mean square error that quantifies a rate-distortion cost or distortion in the residual signal.

Figure 6:
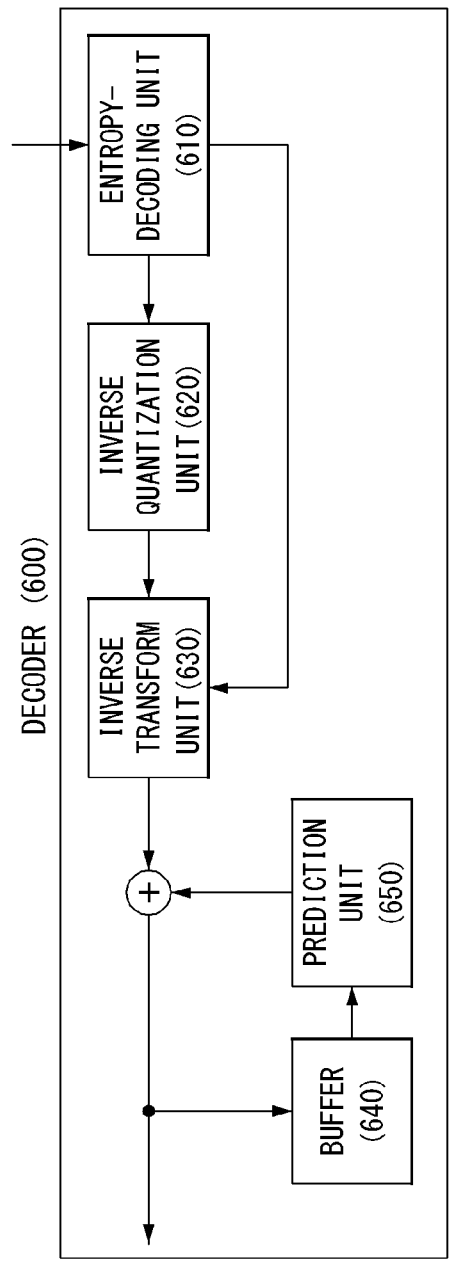
FIG. 6 illustrates a schematic block diagram of a decoder that processes graph-based signals according to one embodiment of the present invention.

FIG. 6 is an embodiment to which the present invention is applied and illustrates a schematic diagram of a decoder that processes a graph-based signal.

The decoder 600 of FIG. 6 receives the signal output by the encoder 500 of FIG. 5.

The entropy decoding unit 610 performs entropy decoding for the received signal. The inverse quantization unit 620 obtains a transform coefficient from the entropy-decoded signal based on quantization step size information.

The inverse transform unit 630 obtains a residual signal by performing an inverse transform for the transform coefficient. In this case, the inverse transform may mean inverse transform for the graph-based transform obtained in the encoder 500. For example, the graph-based transform may indicate a GBLT.

In another embodiment of the present invention, the inverse transform unit 630 may receive a mode index indicative of a transform method or a transform type and derive a transform corresponding to the mode index. For example, the transform may correspond to any one of GBLT and DCT.

A residual signal may be obtained by performing an inverse transform based on the derived transform. In this case, the residual signal indicates an intra-predicted residual signal, but the present invention is not limited thereto. The residual signal may indicate an inter-predicted residual signal.

A reconstructed signal may be generated by adding the residual signal to a prediction signal output by the prediction unit 650.

The buffer 640 stores the reconstructed signal for the future reference of the prediction unit 650.

The prediction unit 650 generates a prediction signal based on a signal that has been previously reconstructed and stored in the buffer 640.

Figure 7:
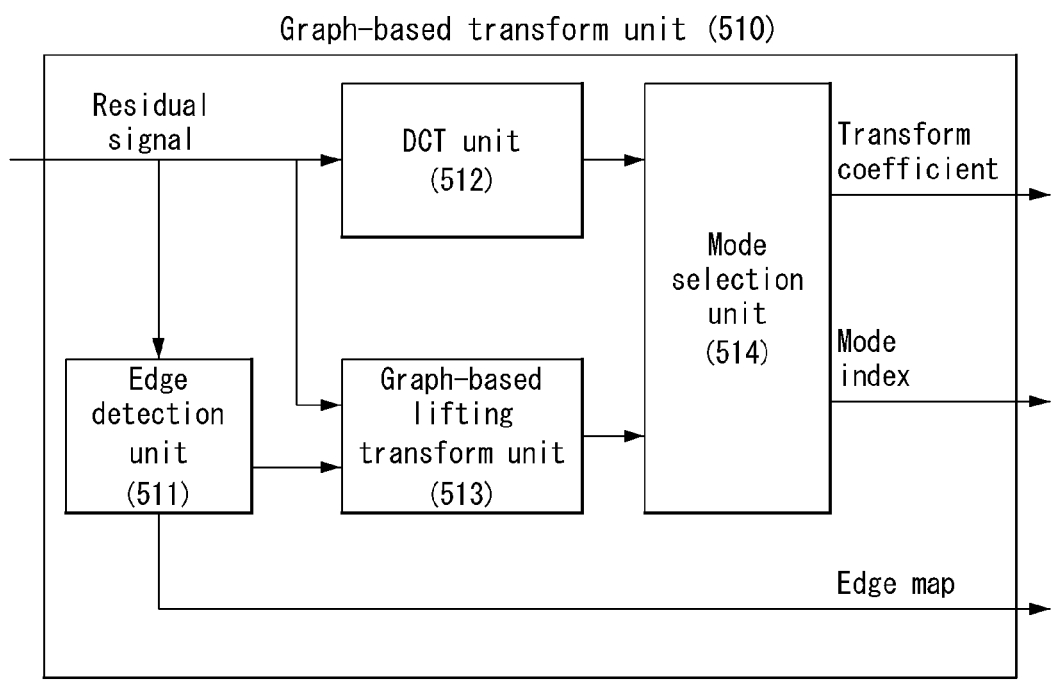
FIG. 7 is an embodiment to which the present invention is applied and shows a schematic internal block diagram of a graph-based transform unit using a graph-based lifting transform (GBLT).

FIG. 7 is an embodiment to which the present invention is applied and shows a schematic internal block diagram of a graph-based transform unit using a graph-based lifting transform (GBLT).

Referring to FIG. 7, the graph-based transform unit 510 may include an edge detection unit 511, a DCT unit 512, a graph-based lifting transform unit 513, and a mode selection unit 514. In order to describe the present invention, for convenience sake, the function units are separated as in FIG.

7 and described in this specification, but this is only an embodiment. The contents of the present invention should not be construed as being limited to the names of the function unit. For example, the following contents may be performed in any one of the function unit, such as the transform unit, the graph-based transform unit, the graph-based lifting transform unit or the processor.

The edge detection unit 511 may detect an edge from a residual signal. In this case, the residual signal may be an intra-predicted residual signal or an inter-predicted residual signal. In this case, the residual signal may be expressed as a residual signal or a difference signal.

The DCT unit 512 may obtain a DCT coefficient by performing a DCT for the residual signal.

The graph-based lifting transform unit 513 may generate a graph based on the detected edge and obtain a GBLT coefficient by performing a GBLT for the graph.

Figure 17:
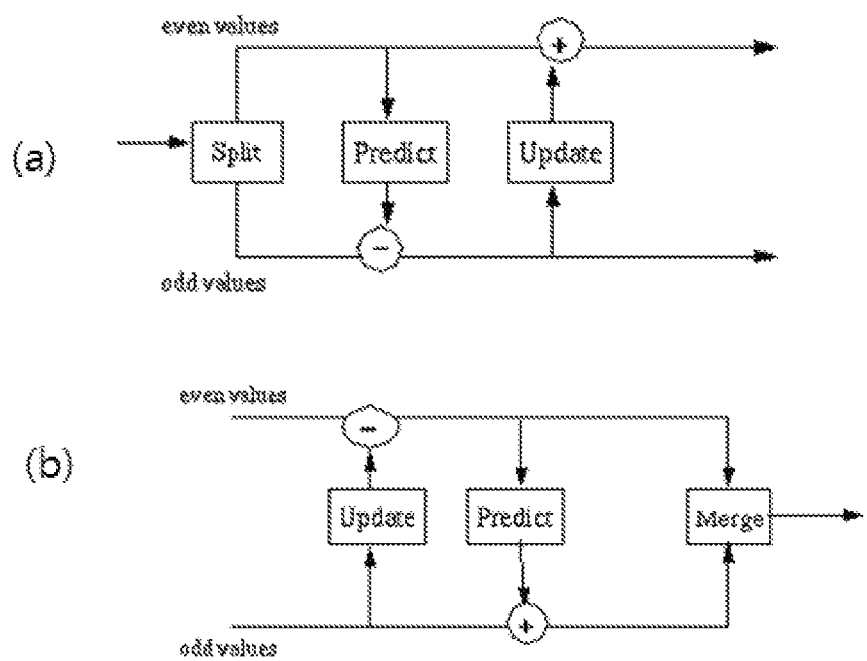
FIG. 17 is an embodiment to which the present invention is applied and shows a schematic structure to which a lifting transform is applied.

A lifting structure basically includes three steps of split or partition, prediction, and update. Each lifting step is always capable of inverse transform and has no loss of information. FIG. 17 shows a schematic structure to which a lifting transform is applied. FIG. 17(a) shows an analysis stage, and FIG. 17(b) shows a composite stage.

First, in the split process, assuming that x[n] is an input signal, first, x[n] may be divided into even and odd multi-phase elements xe[n] and xo[n]. In this case, xe[n]=x[2n], xo[n]=x[2n+1].

In the prediction process, in the interpolation equation of lifting, a multi-phase coefficient xo[n] is predicted from a surrounding coefficient xe[n]. A predictor for each xo[n] may be linearly combined with adjacent even coefficients. This may be expressed into P(xe)[n]=Σ pl xe [n+1]. In this case, a new expression may be obtained by changing x[n] into xo[n] including an error. This leads to a first lifting step d[n]=xo[n]−P(xe)[n].

Lastly, in the update process that is a third step, an even multi-phase coefficient xe[n] is transmitted to a low band-pass filter and becomes a sub-sampled x[n]. This may be updated through the linear combination of xe[n] and the prediction error d[n]. This may be expressed into c[n]=xe[n]+U(d)[n]. In this case, U(d) is linearly combined with the values of the prediction error d.

The mode selection unit 514 may select or determine one transform method by comparing the rate-distortion (RD) cost of a DCT coefficient with the rate-distortion (RD) cost of the GBLT coefficient. For example, when the RD cost of the GBLT coefficient is smaller than the RD cost of the DCT coefficient, the mode selection unit 514 may select a mode index corresponding to a GBLT.

Detailed contents a method of performing the GBLT are described below.

The present invention proposes a graph-based lifting transform for intra-predicted or inter-predicted video sequences. The graph-based lifting transform approximates performance of a graph Fourier transform (GFT) for a given graph, but does not require operation of eigen vectors. Prediction-update bipartition is designed based on a Gaussian Markov random field (GMRF) model having an object of minimizing energy in a prediction set.

In one embodiment, a new reconnection method is applied to multi-level graphs, and this induces a significant gain for the proposed bipartition method and the existing MaxCut-based bipartition. Experiments on intra-predicted video sequences reveal that the proposed method surpasses discrete cosine transform (DCT) and approximates performance of a high complexity GFT although additional overhead for edge information is taken into consideration.

The present invention improves block-based lifting transform and evaluates performance of an intra-predicted residual signal. First, a model for intra-predicted residuals and a bipartition approach that minimizes energy in a prediction set is designed using GMRF. Second, there is proposed a new reconnection scheme that improves prediction in local filter banks. Performance of lifting using the existing MaxCut-based bipartition can also be improved using the reconnection. The results of the proposed method for test sequences surpass the DCT, but may be comparable with results obtained using GFT even without high complexity operation, such as eigen decomposition.

Some preliminaries and lifting transform for graphs are first reviewed, and a bipartition algorithm is discussed based on the GMRF model. Furthermore, a method of designing a filter bank using a graph reconnection based on the proposed bipartition method is described. Finally, experiment result values obtained by comparing complexity of the present invention with that of the GFT are described.

Update-Prediction Bipartition in Lifting Transform (1) Preliminaries

A weighted graph G=(V, E) forms a set of nodes v∈V and edges $e_{i,j}$∈E, and this captures similarities between two connected nodes i and j. The similarity is estimated using a weight $w_{i,j}$∈[0, 1]. Information may be expressed using an adjacency matrix A, and a component thereof is A(i,j)=$w_{i,j}$. A combined Laplacian matrix is defined as L=D−A, and D is a diagonal matrix whose component is D(i,j)=$\Sigma_k w_{i,k}$.

A lifting transform is a multi-level filter bank that guarantees invertibility. In each level m, nodes are separated into two separated sets, a prediction set ($S_P^m$) and an update set ($S_U^m$). The values of ($S_U^m$) are used to predict the values of ($S_P^m$), and the values of ($S_P^m$) are then used to update the values of ($S_U^m$). A smoothed signal within ($S_U^m$) operates as an input signal of a level m+1. Operation for the coefficients of ($S_P^m$) uses only the information of ($S_U^m$), and the vice versa. The execution of the process iteratively calculates multi-solution decomposition.

Regarding video/image compression applications, coefficients in the update set of the highest level q are quantized and entropy-coded along with prediction set information in levels {q−1, q−2, . . . , 1}.

Accordingly, in the present invention, in order to increase coding efficiency, bipartition is designed to minimize energy in a prediction set. The most widely applied method is based on calculating MaxCut, wherein a total link weight between $S_P$ and $S_U$ is maximized. In each weight, similarity between connected nodes is estimated, and similarity between the two sets is maximized by performing MaxCut. If entries within a signal are uniformly distributed, MaxCut may be proved to be optimal in minimizing the lower bound of a $l_1$ size prediction error using linear filters. However, such a model does not take into consideration a correlation between signal entries. Accordingly, the present invention can significantly improve a coding gain using the relations between signal components modeled as Gaussian Markov random fields (GMRF).

(2) Multi-Level Bipartition Based on GMRF Model

A transform to which the present invention is applied may be independently implemented with respect to m×m blocks in an intra-predicted residual video. f∈$\mathbb{R}^{m^2}$ shows a columned block. Each block is thereafter modeled by an implementation of GMRF, wherein f~N(μ,Σ∈$\mathbb{R}^{m^2 \times m^2}$). In the present embodiment, the zero mean is assumed for each block. Σ is a covariance matrix, and the inverse Q=$\Sigma^{-1}$ thereof that is called a prediction matrix estimates a partial correlation between samples. The samples i and j are conditionally independent when Q(i,j)=0. Instead of predicting the components of Q using actual signal statistics, Q is defined as a graph Laplacian function, such as Q=σ$\tilde{L}$, wherein $\tilde{L}$ is defined as L+δL. A small recursive-loop weight δ is used to guarantee matrix invertibility so that a probabilistic determination is valid.

In the present embodiment, the graph of each block may be constructed using edge map information. Each block is first expressed as a 4-connected grid graph. Image edges may be detected based on a pixel gradient. A threshold T is given, and a weight c∈(0, 1) is assigned to a link with respect to i and j having a pixel difference greater than that of T. Two blocks having different image edge structures will have different graph Laplacians and GMRF models.

In the present invention, bipartition may be performed so that an average $l_2$ norm error in a prediction set based on an MAP estimate from an update set is minimized. In this case, $f_P$ indicates a vector including entries corresponding to prediction in f, and $f_U$ indicates a vector for pixels in the update set. Prediction of $f_P$ may be calculated as in Equation 4 with respect to the given $f_U$.

$$\mu_{P|U} = \sum_{PU} \sum_{UU}^{\dagger} f_U \qquad \text{[Equation 4]}$$
$$= \tilde{L}_{PP}^{\dagger} \tilde{L}_{PU} f_U.$$

In this case, $\tilde{L}^{\dagger}$ is the pseudo-inverse of $\tilde{L}$. This may be equivalent to MMSE prediction of GMRF. Thereafter, a bipartition problem may include a sampling problem, and an update set that minimizes MAP prediction in the prediction set is searched for. A target function may be written as in Equation 5:

$$\begin{aligned}S_U^* &= \underset{S_U}{\arg\min} E_{MAP}(S_U, S_P) \qquad \text{[Equation 5]}\\ &= \underset{S_U}{\arg\min} \mathbb{E}[\|f_P - \mu_{P|U}\|^2] \\ &= \underset{S_U}{\arg\min} tr(\mathbb{E}[(f_P - \mu_{P|U})(f_P - \mu_{P|U})^t]) \\ &= \underset{S_U}{\arg\min} tr\Big(\sum_{PP} - \sum_{PU} \sum_{UU}^{\dagger} \sum_{UP}\Big) \\ &= \underset{S_U}{\arg\min} tr(\tilde{L}_{PP}^{\dagger}).\end{aligned}$$

In the present invention, half of nodes in each lifting level may be selected in order to form an update set.

Referring to Table 1, q is the number of levels, and the update set $S_U^m$(S2) for a level m (S1) that is m={1, 2, ... , q} may be calculated using a sampling method shown in the algorithm of Table 1.

TABLE 1

|     | Input graph G = (V, E); $S_U$ = ∅, $S_P$ = V; $\{S_U^m = \emptyset\}_{m=1:q}$ |
| --- | --- |
| S1 | for m = q : −1 : 1 do |
| S2 |    compute the update set size $|S_U^m|$ = $|V|/2^m$ |
| S3 |    for s = 1 : 1 : $|S_U^m|$ do |
|     |       Select $v_i^*$ = arg min$_{v_i}$ $E_{MAP}(S_U \cup \{v_i\}, S_P/\{v_i\})$ |
|     |       $S_P = S_P /\{v_i^*\}$ |
|     |       $S_U = S_U \cup \{v_i^*\}$ |
|     |    end for |
|     |    $S_U^m = S_U$ |
|     | end for |

In the present invention, in order to solve Equation 5, a greedy approach may be used. In each iteration, one node vi is selected and added to an $S_U$ (S3).

Figure 8:
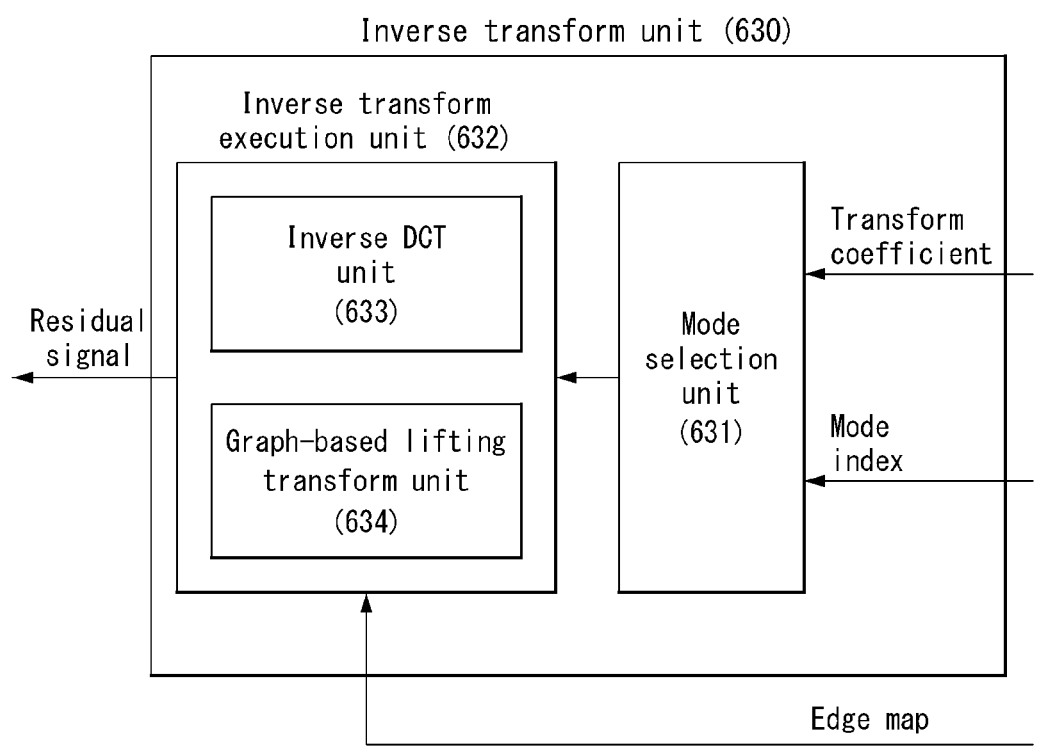
FIG. 8 is an embodiment to which the present invention is applied and shows a schematic internal block diagram of an inverse transform unit using a graph-based lifting transform (GBLT).

FIG. 8 is an embodiment to which the present invention is applied and shows a schematic internal block diagram of an inverse transform unit using a graph-based lifting transform (GBLT).

Referring to FIG. 8, the inverse transform unit 630 may include a mode selection unit 631 and an inverse transform execution unit 632. The inverse transform execution unit 632 may include an inverse DCT unit 633 and an inverse graph-based lifting transform unit 634. In order to describe the present invention, for convenience sake, the function units are separated as in FIG. 8 and described in this specification, but this is only an embodiment. The contents of the present invention should not be construed as being limited to the names of the function units. For example, the following contents may be performed in any of the function units, such as the inverse transform unit, the inverse graph-based transform unit, the inverse graph-based lifting transform unit or the processor.

First, the decoder receives a bit stream and transmits a signal, inverse quantized through entropy decoding and inverse quantization, to the inverse transform unit 630.

The decoder may extract a mode index from the bit stream. The mode selection unit 631 may derive a transform or transform kernel corresponding to the mode index. For example, when the mode index indicates a DCT matrix, a corresponding DCT transform kernel may be derived. When the mode index indicates a GBLT matrix, a corresponding GBLT transform kernel may be derived.

The inverse transform execution unit 632 may perform an inverse transform using the derived transform kernel.

When the mode index indicates DCT, the inverse DCT unit 633 may perform an inverse transform for the DCT transform kernel. When the mode index indicates GBLT, the inverse graph-based lifting transform unit 634 may perform an inverse transform using the GBLT transform kernel.

In another embodiment, when the mode selection unit 631 receives a mode index, the inverse transform execution unit 632 may derive a transform kernel corresponding to the mode index. In this case, the inverse transform unit 630 may receive and use the edge map information to derive the transform kernel.

The inverse transform unit 630 outputs a residual signal. The residual signal is added to a prediction signal to produce a reconstructed signal.

FIG. 9 is an embodiment to which the present invention is applied and is a diagram for illustrating a boundary extension for pixels neighboring a block boundary.

Boundary and Edge Extension

In GMRF, a diagonal matrix(i, j) may be construed as being the inverse of a prediction error for a node i given as V=/{i}. Accordingly, nodes around block boundaries and image edges are considered to have a greater prediction error, and thus high priority is assigned to the nodes in sampling. However, the nodes around the boundaries tend to be farther from other nodes, and prediction using such nodes is made less efficient.

Accordingly, in the present invention, in order to solve this problem, the number of links of each node may be made uniform using a symmetrical boundary extension, such as that shown in FIG. 9. As a result, a graph used for sampling is augmented.

Such an approach complies with a subsequently used filter bank, and also uses a boundary extension having degree normalization. Referring to FIG. 9, a node v (node 11 in FIG.

9) is selected as a sample, and mirror nodes (indicated by 11') are also selected. A weight and boundary node x (e.g., a node 15) between extended nodes v' may be equivalent to weight between v and x. The present invention may also be applied to nodes around image edges, and this may be described in the algorithm of Table 2. This algorithm shows a boundary/edge extension method for sampling in the graph.

TABLE 2

| | |
|---|---|
| Input $S_U = \emptyset, S_P = V$ | |
| Output $S_U$ and $S_P$ after sampling | |
| S1 | Extend an adjacency matrix A to include extended nodes Aext around a boundary and edge |
| S2 | Calculate a Laplacian matrix based on $D_{ext} - A_{ext} + \delta I$ of data within formal batches |
| S3 | Select a sample y based on extended nodes {y', y'', ...} and a previously sampled set and minimize an MAP error within a V/{y} set |
| S4 | $S = S \cup \{y\}$, and $S_c = S_c/\{y\}$ |
| S5 | Repeat steps S3-S4 until a specific sample size is reached |

Figure 10:
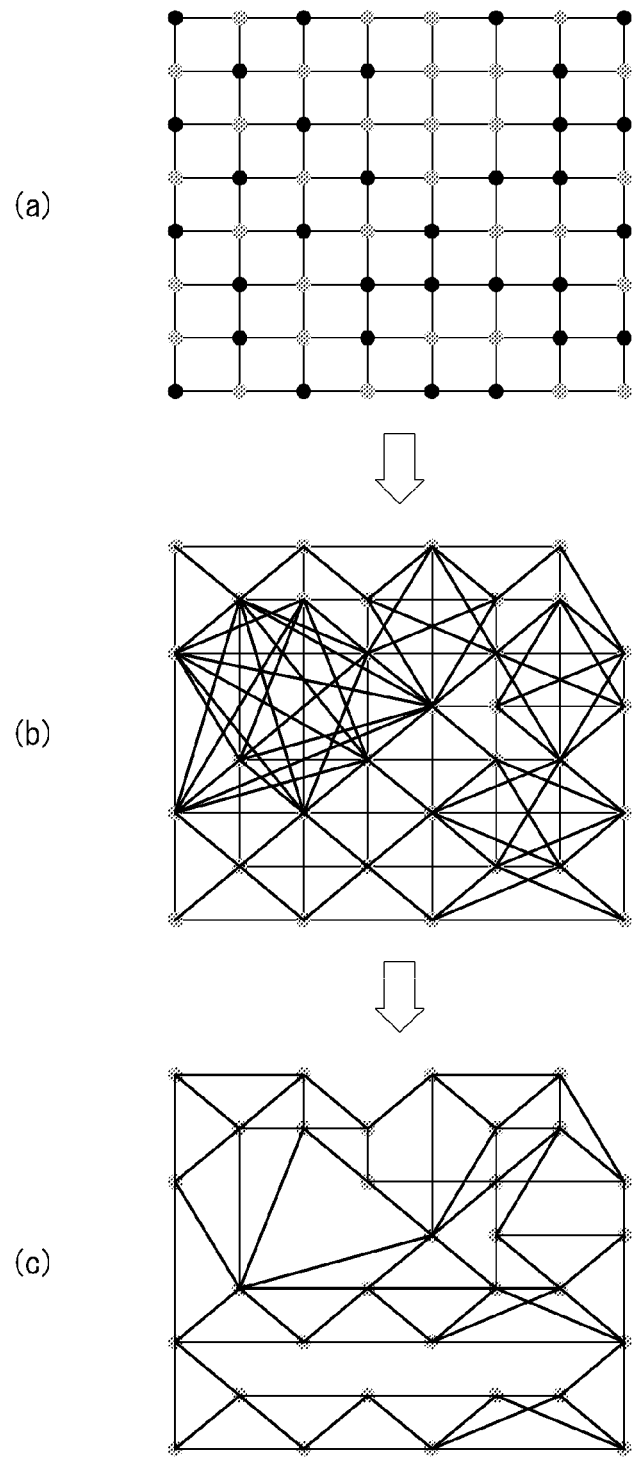
FIG. 10 is an embodiment to which the present invention is applied and shows a graph construction in higher level decomposition through a Kron reduction with respect to an 8×8 block obtained from an intra prediction residual signal.

FIG. 10 is an embodiment to which the present invention is applied and shows a graph construction in higher level decomposition through a Kron reduction with respect to an 8×8 block obtained from an intra prediction residual signal.

Filter Bank Design in Multi-Level Lifting Transform

For a filter bank design, a CDF53-based approach may be used. An input signal (level 0) is defined as s0. In a level m, nodes are first classified into $(S_P^m, S_U^m)$, and coefficients are calculated as in Equation 6.

$$d_{i \in S_P^m}^m = s_{i \in S_P^m}^{m-1} - \sum_{k \in S_U^m} p^m(i,k) \cdot s_k^{m-1}$$ [Equation 6]

$$s_{j \in S_U^m}^m = s_{j \in S_U^m}^{m-1} + \sum_{r \in S_P^m} u^m(j,r) \cdot d_r^m$$

In this case, $s_j^m$ is a smoothing coefficient stored in an update set in the level m, and $d_i^m$ is a detailed coefficient stored in a prediction set in the level m. Smoothing coefficients in a level m−1 are taken as an input signal in the level m. Prediction and update operators are the functions of the adjacency matrix $A^m$ of a graph in the level m.

(1) Graph Construction in Higher Level Decomposition

After the process in the first level lifting transform, only smoothed values (e.g., black node sin FIG. 10(a)) in the update may be used in a next level. Since the number of nodes is reduced and an average distance between the nodes is lengthened, graphs connected for filtering cannot be formed using only 1-hop links used in the level 1.

Accordingly, there is a need for a graph links that provide many global correlations between graph nodes. In order to achieve the need, a Kron reduction using a graph from a level (m−1) is applied to a graph construction in a level m>1. In the Kron reduction, a graph Laplacian for a sub graph S is calculated as $\mathcal{L}(V,S) = L_{S,S} - L_{S,S_c} L_{S_c,S_c}^\dagger L_{S_c,S}$. However, as in FIG. 10(b), in general, a graph provided using the Kron reduction becomes close. Practically, graphs are fully connected after a level 3 with respect to small blocks, such as 8×8, without additional sparsification.

Accordingly, as in FIG. 10(c), in order to negotiate localization and graph connectivity, only k closest neighbors for each node may be maintained and simple sparsification may be applied.

Figure 11:
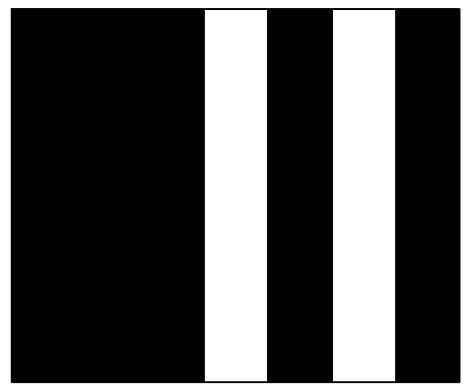
Figure 11:
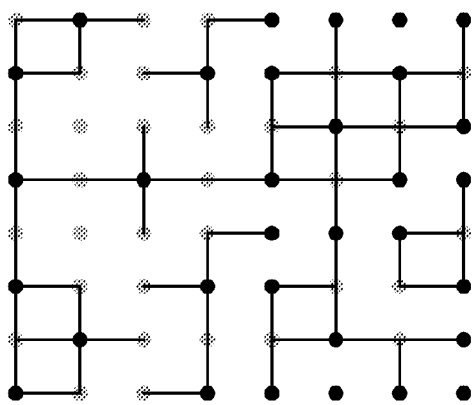
Figure 11:
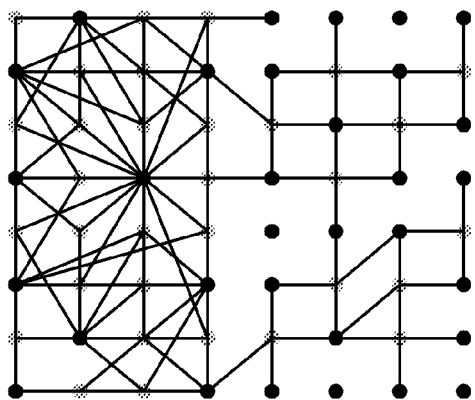

FIG. 11 shows embodiments to which the present invention is applied, wherein FIG. 11(a) shows an image having a smoothing area (left half) and a high dispersion area (right half), FIG. 11(b) shows a bipartition graph used with respect to a prediction/update operator having 1-hop links, and FIG. 11(c) shows a bipartition graph used for prediction/update having links derived from a Kron reduction.

Graph Reconnection for Prediction

In the lifting transform of each level, coefficients within a prediction set are calculated based on only information in an update set, and the vice versa. Accordingly, a graph used for transform is practically a bipartition graph that uses only links to connect nodes within sets on the opposite side.

A bipartition method proposed in the present invention is based on minimizing a prediction error of MAP prediction. As a result, the update set nodes of a high dispersion area, for example, areas having many image edges are concentrated and distributed compared to distributions in a smoothed area. Intuitively, in the smooth area, pixels have similar values although they are spaced apart by several hops. Accordingly, a plurality of update samples is redundant in such an area.

A bipartition graph used for an update and prediction operator also includes only 1-hop links in the primitive graph. As a result, with respect to the area in which sample nodes for an update set are sparsely distributed, nodes within a prediction set do not include links that connect the update set or have only very small links, resulting in a high prediction error.

For example, FIG. 11(a) shows an image consisting of a smoothing area (left half) and a high dispersion area (right half). In contrast, FIG. 11(b) shows a bipartition graph used for a prediction/update operator having 1-hop links. FIG. 11(c) shows a bipartition graph used for prediction/update having links derived from a Kron reduction.

Links in the bipartition graph for transform need to be properly adjusted based on a density change. Furthermore, a Kron reduction is used to reconnect bipartition graphs. An algorithm includes two parts: First, each node v within bipartition method sets $S_P$ is connected to an update set $S_U$ through operation of a sub graph Laplacian $\mathcal{L}(V, S_U \cup \{v\})$, and only links between v and $S_U$ are maintained. Thereafter, sparsification is applied in which only k closest neighbors are maintained with respect to each SP node. From FIG. 11(c), it may be seen that a CDF53 filter bank has been implemented in a sparse bipartition graph.

Figure 12:
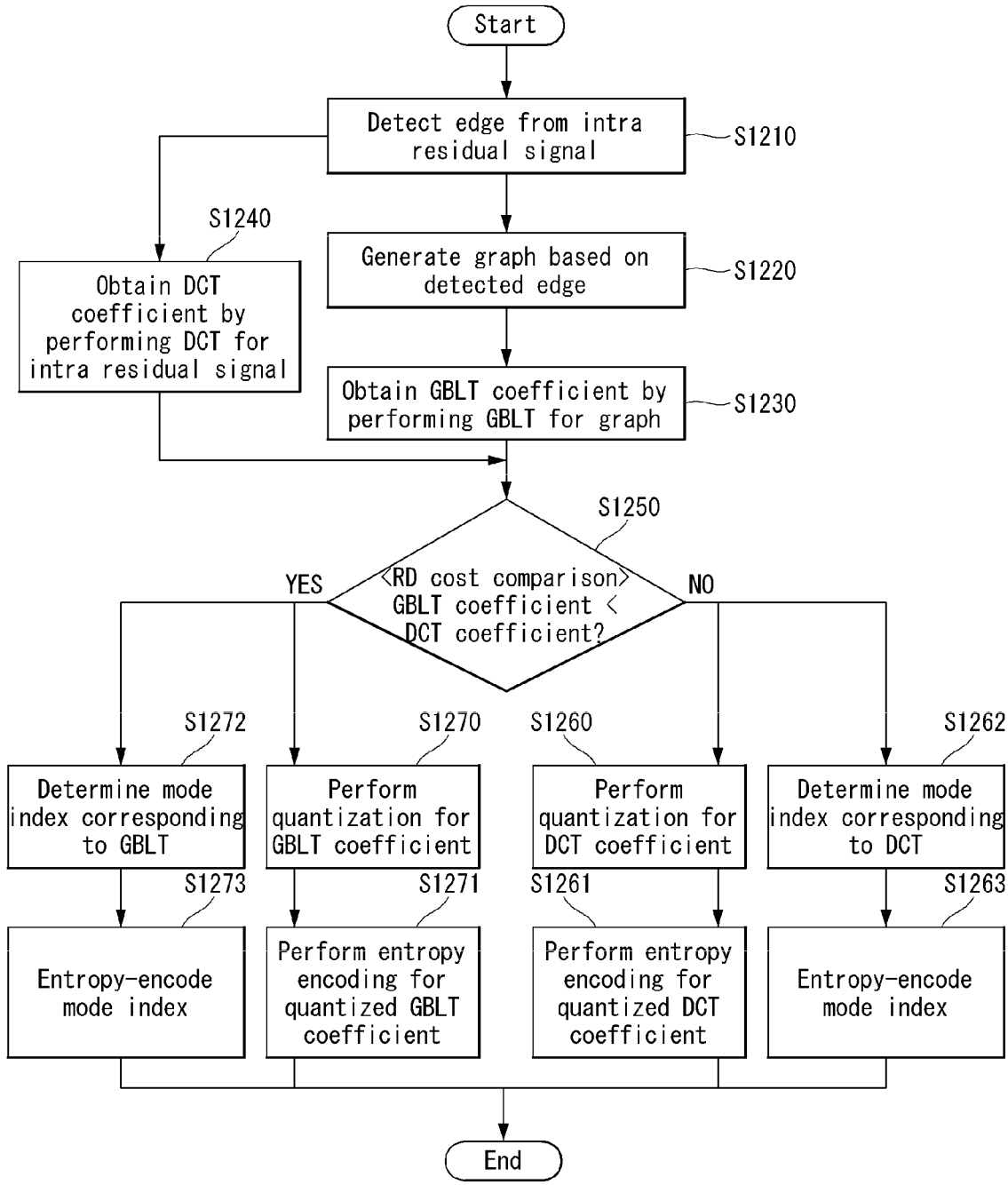
FIG. 12 is an embodiment to which the present invention is applied and is a flowchart for illustrating a method of determining a transform method through a rate distortion (RD) cost comparison of a plurality of transform methods including a graph-based lifting transform.

FIG. 12 is an embodiment to which the present invention is applied and is a flowchart for illustrating a method of determining a transform method through a rate distortion (RD) cost comparison of a plurality of transform methods including a graph-based lifting transform.

The encoder may generate an intra prediction signal through intra prediction, and may generate an intra residual signal by subtracting the intra prediction signal from the original signal.

The encoder may detect an edge from the intra residual signal (S1210) and generate a graph based on the detected edge (S1220).

The encoder may obtain a GBLT coefficient by performing a GBLT for the graph (S1230).

Meanwhile, the encoder may determine an optimal transform method for more efficient coding. To this end, the encoder may obtain a transform coefficient by applying another transform method other than the GBLT. For example, the encoder may obtain a DCT coefficient by performing a DCT for the intra residual signal (S1240).

The encoder may determine an optimal transform method through a comparison between the RD costs of transform coefficients to which a plurality of transform methods has been applied.

For example, the encoder may compare the RD cost of the GBLT coefficient with the RD cost of the DCT coefficient. The encoder may determine whether the RD cost of the GBLT coefficient is smaller than the RD cost of the DCT coefficient (S1250).

When the RD cost of the GBLT coefficient is not smaller than the DCT coefficient, the encoder may perform a quantization for the DCT coefficient (S1260), and may perform an entropy encoding for the quantized DCT coefficient (S1261).

Additionally, the encoder may determine a mode index corresponding to the DCT (S1262), and may entropy-encode the mode index (S1263).

In contrast, when the RD cost of the GBLT coefficient is smaller than that of the DCT coefficient, the encoder may a quantization for the GBLT coefficient (S1270), and may perform an entropy encoding for the quantized GBLT coefficient (S1271).

Additionally, the encoder may determine a mode index corresponding to the GBLT (S1272), and may entropy-encode the mode index (S1273).

Figure 13:
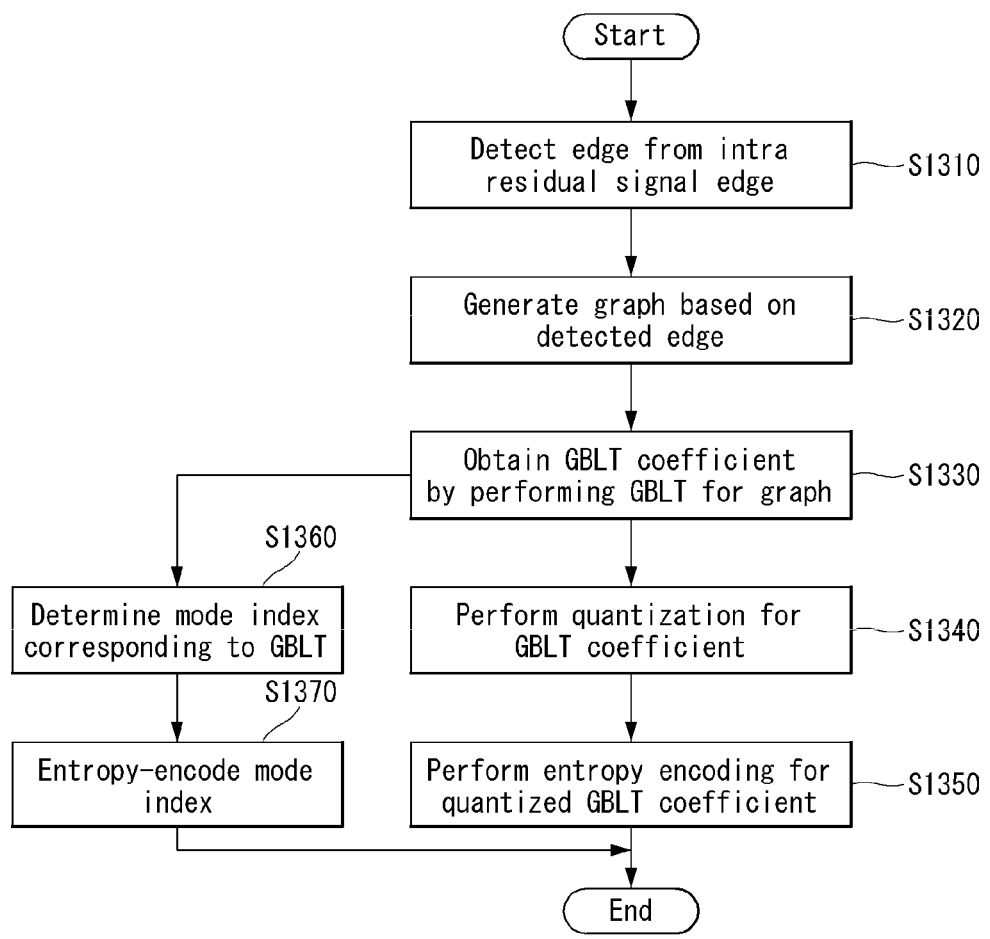
FIG. 13 is an embodiment to which the present invention is applied and is a flowchart for illustrating a method of encoding a video signal using a graph-based lifting transform.

FIG. 13 is an embodiment to which the present invention is applied and is a flowchart for illustrating a method of encoding a video signal using a graph-based lifting transform.

The encoder may generate an intra prediction signal through intra prediction, and may generate an intra residual signal by subtracting the intra prediction signal from the original signal.

The encoder may detect an edge from the intra residual signal edge (S1310) and generate a graph based on the detected edge (S1320).

The encoder may obtain a GBLT coefficient by performing a GBLT for the graph (S1330).

The encoder may perform a quantization for the GBLT coefficient (S1340) and perform an entropy encoding for the quantized GBLT coefficient (S1350).

Meanwhile, the encoder may determine a mode index corresponding to the GBLT (S1360) and entropy-encode the mode index (S1370). Steps S1360 to S1370 may be additionally performed and may not be essential processes.

Figure 14:
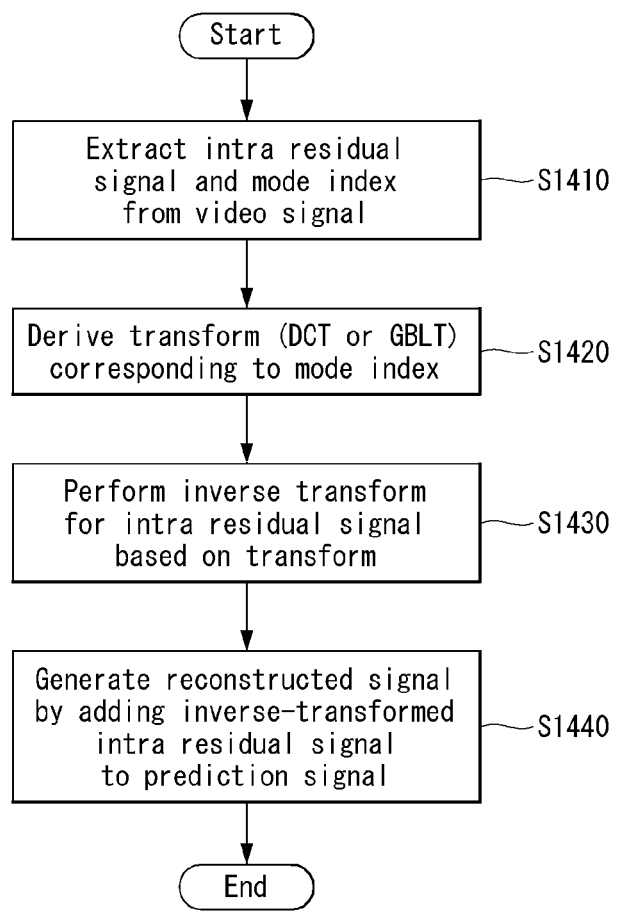
FIG. 14 is an embodiment to which the present invention is applied and is a flowchart for illustrating a method of decoding a video signal using a graph-based lifting transform.

FIG. 14 is an embodiment to which the present invention is applied and is a flowchart for illustrating a method of decoding a video signal using a graph-based lifting transform.

The decoder may receive a bit stream transmitted by the encoder. The bit stream may be entropy-decoded through the entropy decoding unit. The entropy-decoded signal may be transmitted to the inverse quantization unit and inverse quantized. The inverse quantized signal is transmitted to the inverse transform unit. In this case, the inverse quantized signal may correspond to an intra residual signal or an inter residual signal.

The decoder may extract a mode index from the received bit stream (S1410). In this case, the mode index may mean information indicative of a transform method or a transform type. For example, a transform corresponding to the mode index may be any one of a DCT and a GBLT.

The decoder may derive a transform corresponding to the mode index (S1420). For example, the transform may correspond to the DCT or the GBLT.

The decoder may perform an inverse transform for the intra residual signal based on the transform (S1430).

The decoder may generate a reconstructed signal by adding the inverse-transformed intra residual signal to a prediction signal (S1440).

Figure 15:
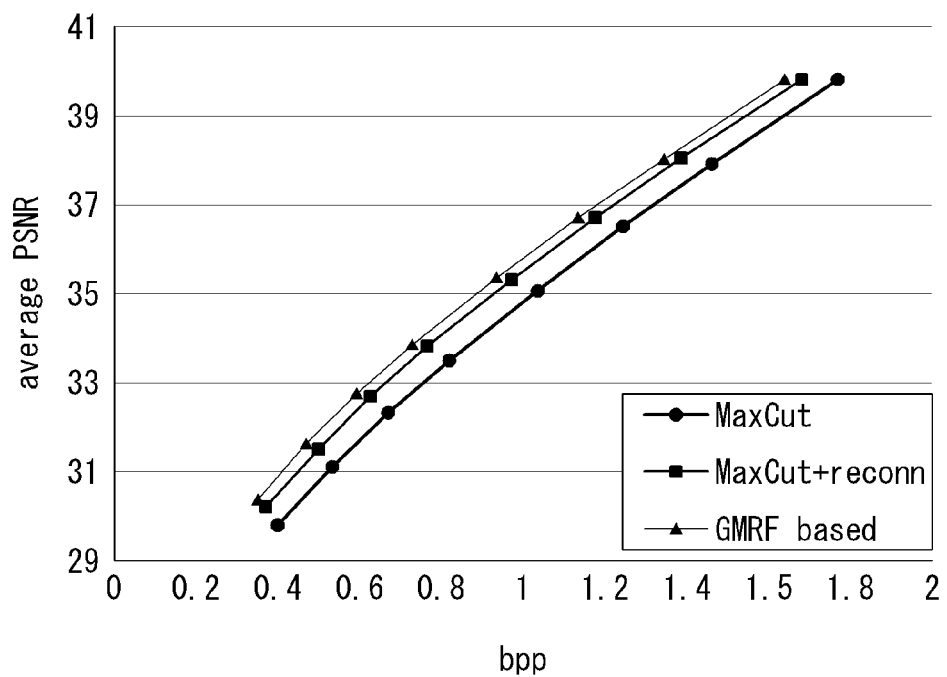
FIG. 15 is an embodiment to which the present invention is applied and is a table for comparing the coding gain of MaxCut-based lifting with the coding gain of MaxCut-based lifting using a reconnection scheme of the present invention.

FIG. 15 is an embodiment to which the present invention is applied and is a table for comparing the coding gain of MaxCut-based lifting with the coding gain of MaxCut-based lifting using the reconnection scheme of the present invention.

The coding gain of the bipartition method proposed by the present invention is compared with the coding gain of a reconnection approach using MaxCut based on lifting. Test sequences consist of 7 frames of 7 video sequences. The results are shown in FIG. 15. The results include the results of MaxCut-based bipartition having a reconnection using a Kron reduction. Although a simple bipartition method such as greedy approximated MaxCut is used, performance of the method using a better designed reconnection is comparable with that using a GMRF model.

Transform complexities of a graph-based lifting transform and GFT for a graph G of a size N are described below.

GFT operations for each graph include searching for an eigen vector and applying a transform. Eigen vector decomposition is a high-complexity process having $O(N^3)$ although a Laplacian matrix is sparse. The transform requires a matrix-vector product having $O(N^2)$ due to the fact that matrices have commonly high density.

Next, the complexity of a lifting transform based on greedy MaxCut bipartition and a graph reconnection is taken into consideration, and this provides performance comparable to GMRF-based bipartition.

In the present invention, generation based on lifting may include three parts: bipartition using approximated MaxCut, a reconnection using a Kron reduction, and the generation of a graph in a next high level.

Greedy MaxCut selects nodes having a maximum gain in response to an initial degree. Initialization requires arrangement, and this has $O(N \log N)$ if a better data structure, such as a max-heap, is used. In each iteration, after a node having a maximum gain is selected, the gain of an adjacent node will be adjusted. The max-heap of gain values will be adjusted, and this has $O(N \log N)$ because the number of neighbors is constant with respect to sparse graphs.

As to a Kron reduction, operation of L(V, S) may be iteratively implemented although it requires adopting an inverse matrix. Furthermore, in V=S, nodes are removed one by one, and complexity depends on the number of links connected to the removed node.

The present invention also shows that a graph maintains a sparsification pattern in the Kron iteration. c is defined to become a maximum number of links for the node removed during the Kron iteration. Since a cost for removing one node is $O(c^2)$, total complexity for a Kron reduction is $O(c^2 N)$. It is necessary to perform a reconnection on all of nodes in a prediction set. However, since only a connection to an the update set for specific prediction nodes is taken into consideration during the Kron reduction, a cost for removing one node is $O(c)$. Accordingly, total complexity for a reconnection is $O(cN^2)$.

The number of lifting levels required is log N because half of the nodes in each level is taken. As a result, total complexity for defining a lifting base is $O(cN^2 \log N)$. Much lower complexity may be expected in an actual implementation because a graph size in high lifting levels may be small.

Since operation for each node requires only neighbors, a lifting transform has complexity $O(N)$ in each step, and this is constant in a scarce graph. Accordingly, total complexity of a transform application is O(N log N). In an actual application, if graphs can be previously calculated as templates, single necessary operation is a transform portion, and graph lifting provides a significant complexity reduction compared to GFT. In implementing the present invention, graph-based lifting transforms are 50% or more faster than GFTs.

FIG. 16 is an embodiment to which the present invention is applied and is a table for a comparison in the average PSNR gains and bit rate reductions between GFT, lifting GMRF sampling, MaxCut-based lifting, and MaxCut-based lifting using the reconnection scheme.

In the experiments of the present invention, intra prediction residual frames having a fixed transform unit size of 8×8 are generated with respect to test sequences; Foreman, Mobile, Silent, and Deadline for HEVC(HM-14).

The encoder to which the present invention is applied has been described in FIGS. 1, 5 and 7, and all of the embodiments described in this specification may be applicable.

The encoder may select a transform having the least RD cost defined as (SSE+λ·bit rate), and may determine a mode index. For example, the mode index may be $\lambda = 0.85 \cdot 2^{(QP-12)/5}$. That is, the encoder may select a transform having the least RD cost based on a quantization parameter QP (e.g., a quantization step size).

As to a block encoded using graph-based lifting, image edge overhead may be coded using arithmetic edge coding (AEC) for first connecting adjacent edge components using contours and then encoding each of the contours using a context-based method. In each 8×8 block, only one contour may be permitted.

Furthermore, the encoder needs to transmit a flag indicative of a selected transform. A DCT and, for example, the flag may indicate a mode index. Lifting-transformed coefficients are uniformly quantized and are coded using an amplitude group split scheme called amplitude group partition (AGP). The AGP provides a fair comparison between different transforms because different coefficient distributions are aware and applied. Prior to quantization, the coefficients of a CDF53 lifting transform are normalized in order to compensate for the insufficiency of orthogonality. DCT coefficients are scanned in zigzags, and GBLT coefficients may be arranged from the lowest frequency (an update set in the highest level) to the highest frequency (an update set in the first level). In each subband, coefficients may be arranged from low reliability to high reliability.

FIG. 16 shows average PSNR gains and bit rate reductions. As to videos having simple edge structures such as Foreman and Deadline, graph-based lifting has about 0.3 dB gain in the PSNR. In contrast, in videos having a complicated edge structure such as Mobile, a gain is limited because a cost is dominant in an edge map. It may be seen that the MaxCut-based bipartition method having a graph reconnection provides excellent approximation to both the GMRF-based bipartition method having high complexity and GFT.

As described above, the embodiments explained in the present invention may be implemented and performed in a processor, a micro-processor, a controller or a chip. For example, the functional modules explained in FIGS. 1, 2 and 5 to 8 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method of encoding a video signal based on a graph-based lifting transform (GBLT), comprising:

detecting an edge from an intra residual signal, wherein a model for the intra residual signal is designed by using a Gaussian Markov Random Field (GMRF);

generating a graph based on the edge, wherein the graph comprises a node and a weight link;

obtaining a GBLT coefficient by performing the GBLT for the graph;

quantizing the GBLT coefficient; and entropy-encoding the quantized GBLT coefficient, wherein the GBLT comprises a split process, a prediction process, and an update process, wherein the split process of the GBLT is performed to minimize a Maximum A Posteriori (MAP) estimate error within a prediction set, and wherein the method further comprises:

obtaining a DCT coefficient by performing a DCT on the intra residual signal;

comparing a rate-distortion cost of the DCT coefficient with a rate-distortion cost of the GBLT coefficient;

determining, based on the rate-distortion cost of the GBLT coefficient being smaller than the rate-distortion cost of the DCT coefficient, a mode index corresponding to the GBLT; and entropy-encoding the mode index.

2. The method of claim 1, wherein the split process comprises:
    calculating a size of an update set;
    selecting a node minimizing an MAP estimate error within a prediction set based on the size of the update set; and
    calculating an update set for the selected node.

3. The method of claim 1, wherein the graph is reconnected prior to a next GBLT.

4. A method of decoding a video signal based on a graph-based lifting transform (GBLT), comprising:
    extracting a mode index indicative of a transform method from the video signal;
    deriving a transform corresponding to the mode index, wherein the transform indicates one of a DCT and the GBLT;
    performing an inverse transform for an intra residual signal based on the transform; and
    generating a reconstructed signal by adding the inverse-transformed intra residual signal to a prediction signal,
    wherein a model for the intra residual signal is designed by using a Gaussian Markov Random Field (GMRF),
    wherein the mode index is determined by comparing a rate-distortion cost of a DCT coefficient with a rate-distortion cost of a GBLT coefficient, and
    wherein a split process of the GBLT is performed to minimize a Maximum A Posteriori (MAP) estimate error within a prediction set.

5. An apparatus for encoding a video signal based on a graph-based lifting transform (GBLT), comprising:
    a processor configured to:
        detect an edge from an intra residual signal, wherein a model for the intra residual signal is designed by using a Gaussian Markov Random Field (GMRF);
        generate a graph based on the detected edge and obtaining a graph-based lifting transform (GBLT) coefficient by performing the GBLT for the graph;
        quantize the GBLT coefficient; and
        perform entropy encoding for the quantized GBLT coefficient,
    wherein the GBLT comprises a split process, a prediction process, and an update process,
    wherein the split process of the GBLT is performed to minimize a Maximum A Posteriori (MAP) estimate error within a prediction set, and
    wherein the processor is further configured to:
        obtain a DCT coefficient by performing a DCT on the intra residual signal;
        compare a rate-distortion cost of the DCT coefficient with a rate-distortion cost of the GBLT coefficient;
        determine, based on the rate-distortion cost of the GBLT coefficient being smaller than the rate-distortion cost of the DCT coefficient, a mode index corresponding to the GBLT; and
        entropy-encode the mode index.

6. An apparatus for decoding a video signal based on a graph-based lifting transform (GBLT), comprising:
    a processor configured to:
        extract a mode index indicative of a transform method from the video signal;
        derive a transform corresponding to the mode index and perform an inverse transform for an intra residual signal based on the transform; and
        generate a reconstructed signal by adding the inverse-transformed intra residual signal to a prediction signal,
    wherein a model for the intra residual signal is designed by using a Gaussian Markov Random Field (GMRF), and
    wherein the transform indicates one of a DCT and the GBLT,
    wherein the mode index is determined by comparing a rate-distortion cost of a DCT coefficient with a rate-distortion cost of a GBLT coefficient, and
    wherein a split process of the GBLT is performed to minimize a Maximum A Posteriori (MAP) estimate error within a prediction set.

* * * * *